Oct. 4, 1932.  J. J. EYRE  1,880,951

CUTTING TOOL

Filed Jan. 19, 1931

Inventor:
John J. Eyre,
by Emery, Booth, Varney & Townsend
Attys

Patented Oct. 4, 1932

1,880,951

UNITED STATES PATENT OFFICE

JOHN J. EYRE, OF SAUGUS, MASSACHUSETTS, ASSIGNOR TO H. K. PORTER, INC., A CORPORATION OF MASSACHUSETTS

CUTTING TOOL

Application filed January 19, 1931. Serial No. 509,768.

This invention aims to provide a strong quick-acting "two-way" adjusting device for each cutting jaw, and the invention further aims to effect a reduction in the length and quantity of high grade steel used in the cutting jaws thereby reducing replacement costs.

In the accompanying drawing, wherein I have shown merely for illustrative purposes one embodiment of my invention, Fig. 1 is a side elevation of the cutting tool;

Figure 1:
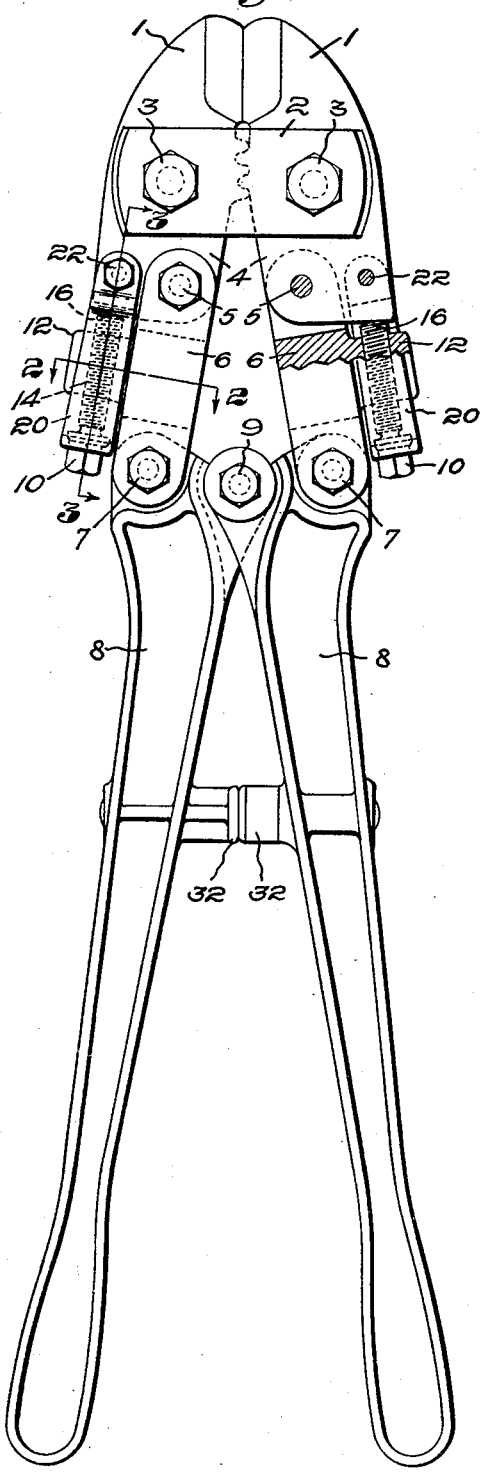
Figure 2:
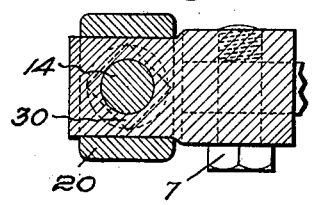
Fig. 2 is a transverse section on line 2—2 of Fig. 1.

The particular embodiment of the invention selected for purposes of illustration and shown in the drawing comprises cutting jaws 1 pivotally connected together in cooperative relation by means of links 2 and screws 3.

The rear end 4 of each cutting jaw 1 is pivotally connected by a screw 5 with an adjusting link 6, the opposite ends of said links being further pivotally connected by screws 7 with their respective handle levers 8, which handle levers are further pivotally connected together by a stud 9. The said links 6 just described are connected with their respective cutting jaws and handle levers by means whereby said cutting jaws may be adjusted relatively to each other to compensate for wear upon their cutting edges. For convenience I have shown in this connection adjusting screws 10 so arranged relatively to said cutting jaws that rotation of said adjusting screws in one direction will move the cutting edges toward each other while rotation of said screws in opposite directions causes said cutting edges to be moved away from each other, in other words providing a simple "two-way" adjustment for each cutting jaw.

To accomplish the foregoing result I preferably provide herein a lug 12 projecting laterally from the outer face of each link 6 and screw threaded at 14 to receive the adjusting screw 10. The screw threaded end 16 of the screw 10 is arranged to engage the face 18 of the rear end 4 of the outer edge of cutting jaw 1 (see Fig. 3). A yoke 20 is pivotally connected by a screw 22 with said rear end 4 of cutting jaws 1. The end of the yoke 20 opposite said pivot 22 is closed at 24, and this closed end is drilled concavely or countersunk at 26 to receive a similarly convexly shaped flange 28 formed upon said screw adjacent to the head 30 thereof which herein projects through the hold 32 in the closed end of said yoke. The flange 28 is arranged to seat in said countersunk hole of said yoke against the inner face thereof, and maintains said yoke in straddling relation with said lug 12 with the end 16 of the screw 10 engaging the surface 18 of the rear end of said jaw. The flange 28 engaging the closed end of said yoke serves as one abutment and the end 16 of said screw engaging the surface 18 serves as the other abutment for effecting a change in the angular relation of said cutting jaw and link 6, upon rotation of said adjusting screw in one direction or the other, due to the rotation of the squared head 30 of said screw, thus producing a quick "two-way" adjustment for the cutting edges.

Figure 3:
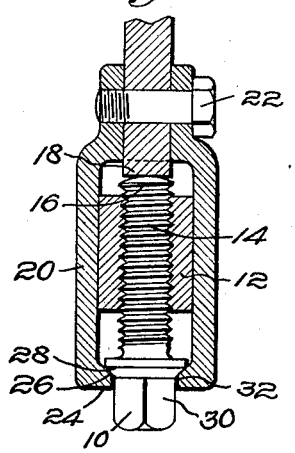
Fig. 3 is a section taken on line 3—3 of Fig. 1.

In the form shown in Figs. 1 and 3 the adjusting screw 10 is arranged substantially parallel with its link 6 lying close against said link, thus providing a very compact adjusting device that is neat in appearance and very powerful. In operation the screw 10 is rotated by means of a wrench or tool applied to the head 30 and moves said screw 14 longitudinally of the leg 12, whereupon the end 18 of the rear end 4 of the cutting jaw causes the link 6 to be rocked about the axis of the screw 5 to change the angle of said surface 18 relatively to the link 6 and operating handle lever 8. By this means the angular relation of the operating lever 8 and the cutting jaw thereof is varied so that the cutting edges of the cutting jaws will come together more quickly or coincidently with the abutting of the stops 32' formed upon the inner edges of the handle levers 8.

Figure 4:
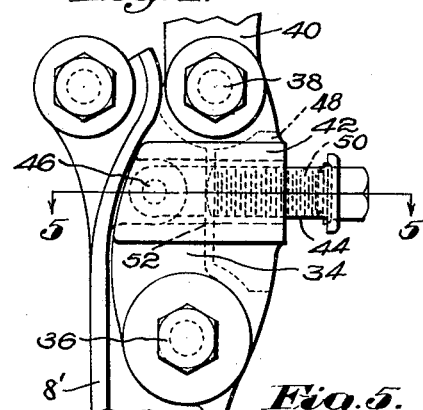
Fig. 4 is a partial side elevation of a modified form of adjusting section with parts broken away to save space.
Figure 5:
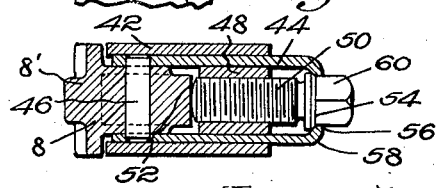
Fig. 5 is a detail section taken on line 5—5 of Fig. 4.

In Figs. 4 and 5 is illustrated a modified form of adjusting section which herein comprises an adjusting section 34 pivotally connected by stud 36 to its handle lever 8'. The opposite end of said adjusting section 34 is pivotally connected by a stud 38 with the tail 40 of its cutting jaw (not shown). The adjusting section 34 is suitably enlarged at 42 and recessed to receive the legs of a yoke 44. The yoke 44 at its open or inner end is connected by a pin 46 with the anvil portion of the handle member 8', and from said pin 46 the legs of said yoke extends outwardly straddling an integral portion 48 of the adjusting section in which a screw 50 is threaded. The end of said screw 50 is arranged to engage a surface 52 upon the handle member 8'. The screw 50 is provided with a flanged part 54 which is arranged to seat within a suitably shaped recess 56 in the closed end 58 of the yoke 44. The head 60 of the screw 50 projects through the closed end 58 of said yoke and is polygonal in form for effecting the rotation of the screw 50, which rotation effects the in and out movement of the adjusting section or link 34, producing an angular movement thereof relatively to the handle lever 8' and the consequent swinging movement of the cutting jaw.

The legs of the yoke 44 in straddling the portion 48 to connect with the pin 46, pass beneath and are concealed by flange-like extensions of the enlargement 42 which overlap the ends of said pivot pin and prevent said pin from working out in either direction.

An outstanding advantage of the present tool over former bolt clippers and cutting tools is that the cutting jaws which are essentially made of high grade steel have relatively shorter rear ends, hence materially reducing the amount of said high grade steel required, thereby reducing the replacement costs of the cutting jaws.

The invention is not limited to the embodiment shown.

I claim:

1. In a cutting tool, a cutting jaw having a relatively short rear end, a pivoted handle lever for said jaw, an adjusting section interposed between said cutting jaw and handle lever, said adjusting section having a laterally disposed lug, an adjusting screw engaging said lug and the rear end of said cutting jaw, and a yoke cooperating with the rear end of said cutting jaw and said screw to swing said adjusting section relatively to said cutting jaw.

2. In a cutting tool, in combination, an adjusting section, a cutting jaw and handle arranged upon opposite ends of said adjusting section, an adjusting screw arranged in said adjusting section outside the plane of the center line of the pivots uniting said adjusting section with said cutting jaw and handle, said adjusting screw abutting the outermost point in the tail end of said cutting jaw thereby exerting a maximum cutting pressure.

3. In a cutting tool, in combination, a cutting jaw, a handle lever, an adjusting section interposed between said cutting jaw and said handle lever, and a two-way adjusting means arranged approximately parallel with the central longitudinal plane of said tool.

4. In a tool of the class described, a pivoted jaw, a pivoted handle lever, a link interposed between them and having a threaded lug receiving an adjusting screw, an end of which abuts one of the connected parts, and a yoke carried by said part embracing said lug and providing a supporting bearing for the other end of the screw.

5. In a tool of the class described, a pivoted jaw, a pivoted handle lever, a link interposed between them and having a threaded lug projecting laterally therefrom and receiving an adjusting screw disposed substantially parallel with said link, an end of said screw abutting one of the connected parts to swing the same about its point of connection with the link through a substantially transversely extending crank arm, and a yoke carried by said part embracing said lug and providing a supporting bearing for the other end of the screw.

6. In a tool of the class described, a pivoted jaw, a pivoted handle lever, a link connecting said parts and pivoted to the jaw substantially at its rearmost end, the rear end of the jaw extending substantially laterally from the point of pivotal connection to provide a crank arm, and means interposed between such extension of the jaw and the link for relatively angularly adjusting the same.

7. In a tool of the class described, a pivoted jaw, a pivoted handle lever, a link connecting said parts and pivoted to the jaw substantially at its rearmost end, the rear end of the jaw extending substantially laterally from the point of pivotal connection to provide a crank arm, and means disposed laterally of the link and substantially parallel to the same and received beneath the overhang of such extension for relatively angularly adjusting jaw and link.

8. In a tool of the class described, a pivoted jaw, a pivoted handle lever, a link connecting said parts and pivoted to the jaw substantially at its rearmost end, the rear end of the jaw extending substantially laterally from the point of pivotal connection to provide a crank arm, said link having a projecting lug opposing said extension, a screw threaded in said lug and abutting the extension, and a yoke carried by said extension embracing said lug and providing a supporting bearing for the other end of the screw.

In testimony whereof, I have signed my name to this specification.

JOHN J. EYRE.